Aug. 31, 1926. 1,597,666
J. M. BARR
ROTOR
Original Filed Dec. 6, 1922    3 Sheets-Sheet 1

Inventor:
John M. Barr
By Edwin B. H. Tower Jr. Atty.

Aug. 31, 1926.
J. M. BARR
ROTOR
Original Filed Dec. 6, 1922   3 Sheets-Sheet 2
1,597,666
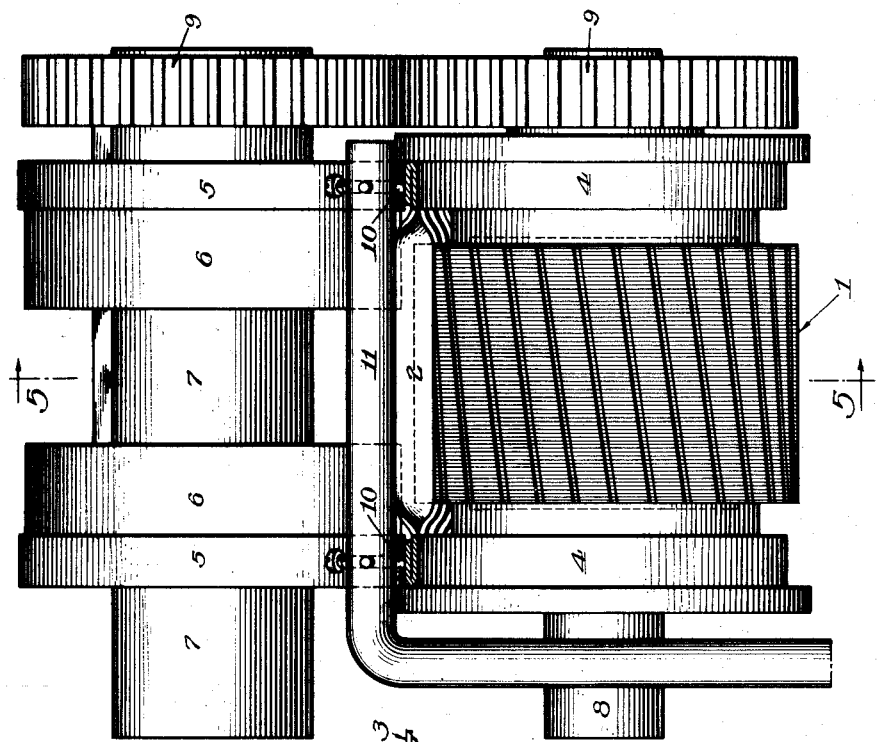
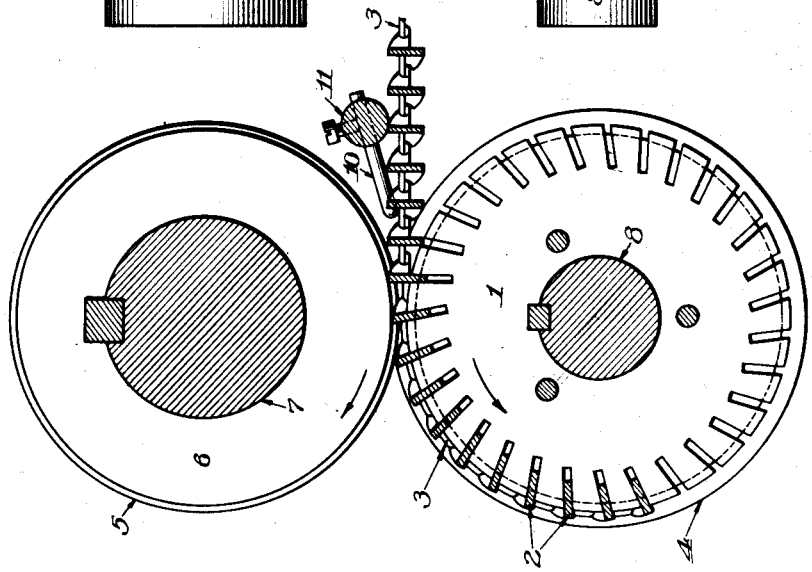
Inventor
John M. Barr
By: Edwin B. H. Lawer Jr. Atty.

Aug. 31, 1926. 1,597,666
J. M. BARR
ROTOR
Original Filed Dec. 6, 1922 3 Sheets-Sheet 3
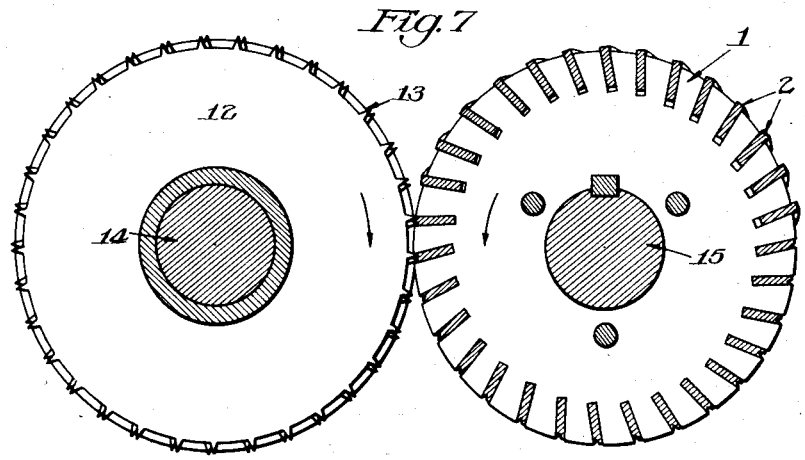
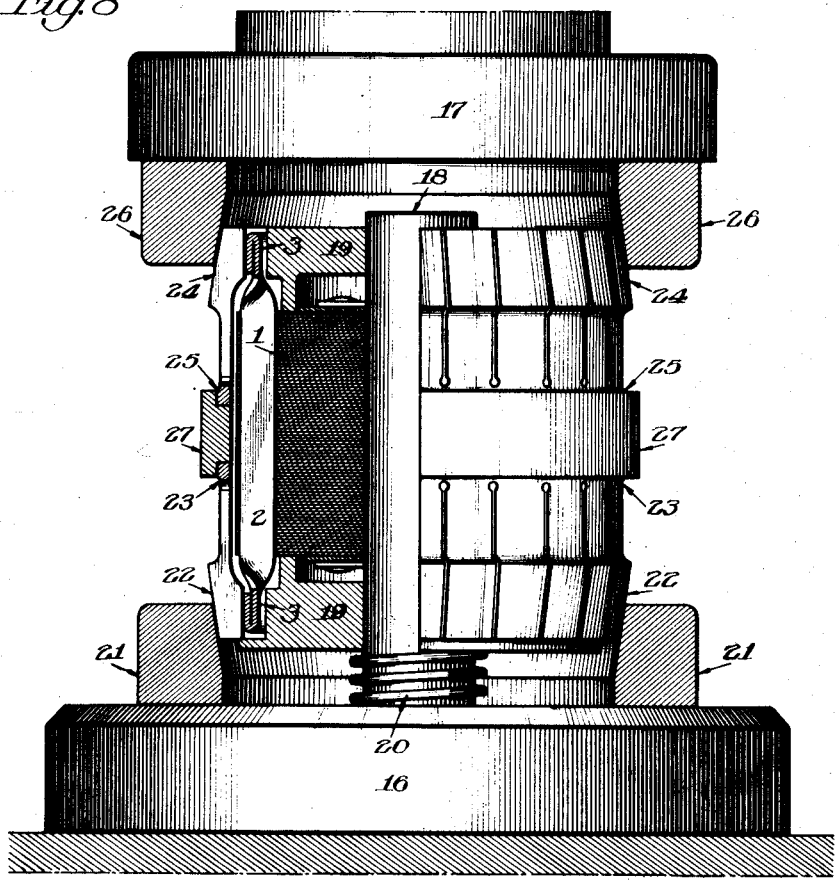
Inventor:
John M. Barr Patented Aug. 31, 1926.

1,597,666

UNITED STATES PATENT OFFICE.

JOHN M. BARR, OF ERIE, PENNSYLVANIA, ASSIGNOR TO THE LOUIS ALLIS COMPANY, OF MILWAUKEE, WISCONSIN, A CORPORATION OF WISCONSIN.

ROTOR.

Continuation of application Serial No. 605,228, filed December 6, 1922. This application filed January 20, 1926. Serial No. 82,552.

This invention relates to a rotor and the method of making the same.

The ordinary rotor for an induction motor comprises a core having longitudinal peripheral slots, a winding having longitudinal conductors arranged in the slots, and end rings connected to the longitudinal conductors.

The difficulty that has been experienced in employing a sheet metal winding has been in fastening and retaining its longitudinal conductors in place.

This application is a continuation of application filed December 6, 1922, Serial No. 605,228, as to matter common to both applications.

An object of this invention is to provide the rotor with a sheet metal winding which has its longitudinal conductors firmly held in a definite and fixed position in the slots.

Another object is to provide a rotor which is strong, durable and efficient, and which may be readily and economically manufactured.

The invention contemplates a rotor provided with a sheet metal winding having its end rings perimetrically contracted to exert a continual inward radial pull upon its longitudinal conductors to hold them in firm contact with the bottoms of the slots or other seats therein.

An efficient and expeditious way to apply the winding and make the rotor is to roll a flat winding upon the core, then unite its end rings to make them continuous, and finally contract the end rings to cause them to exert a continual inward radial pull upon the longitudinal conductors.

This invention provides a rotor with a sheet metal winding, the longitudinal conductors of which are fastened and retained in the slots in a definite and fixed position.

These conductors will not become loosened or displaced by centrifugal or magnetic force and will not cause any noise.

The method that may be employed in making the rotor is hereinafter specifically set forth.

The accompanying drawings illustrate a rotor embodying this invention and machines that may be employed in making such rotor and the views therein are as follows:

Fig. 5 is a sectional side view of a rolling machine for applying the winding to the core.

Fig. 6 is a front view of the rolling machine.

Fig. 7 is a side view of a setting machine for setting the longitudinal conductors in place and expanding the same.

Fig. 8 is a sectional side view of a contracting machine for contracting the end rings.

Rotor.

The rotor is provided with a cylindrical laminated core 1 having longitudinal peripheral slots and a sheet metal winding having integral longitudinal conductors 2 and circular end rings 3.

The longitudinal conductors are arranged within the slots and bear upon the bottoms thereof or other seats therefor.

The end rings are perimetrically contracted or otherwise caused to exert a continual inward radial pull upon the longitudinal conductors.

Accordingly, the longitudinal conductors are held in firm engagement with the seats therefor in the slots and thereby fastened and retained in a definite and fixed position.

The longitudinal conductors may be laterally expanded within the slots to impinge upon the side of the walls thereof and thereby aid in holding them in place.

The end rings may be folded or doubled to strengthen the same and increase the current capacity thereof.

The winding may be applied to the core and its end rings contracted in various ways.

It may consist of a single sheet metal piece or of several sheet metal pieces joined together.

The end rings by exerting a continual inward pull hold the longitudinal conductors in a fixed and definite position from which they will not become loosened or displaced by centrifugal or magnetic force.

The method that may be employed in making the rotor will now be explained.

Method of making rotor.

Figure 1:
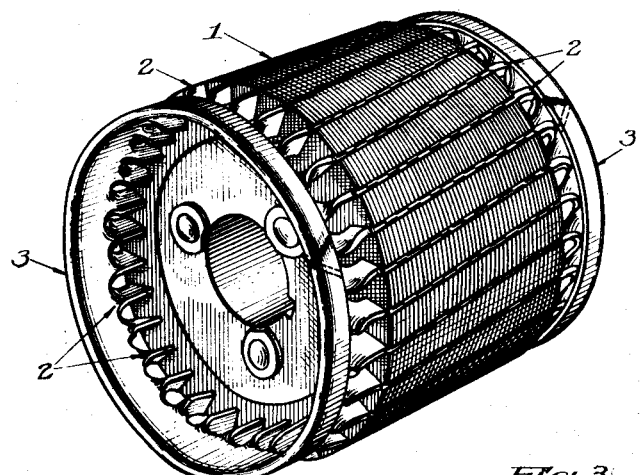
Fig. 1 is a perspective view of the rotor.
Figure 2:
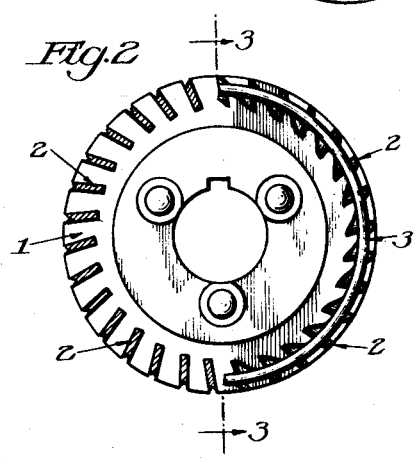
Fig. 2 is an end view thereof, half in section, on the lines 2—2 of Fig. 3.
Figure 3:
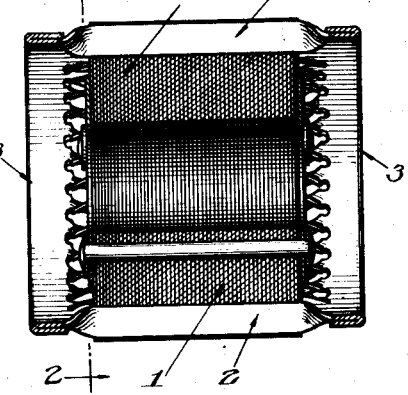
Fig. 3 is a longitudinal sectional view on the line 3—3 of Fig. 2.
Figure 4:
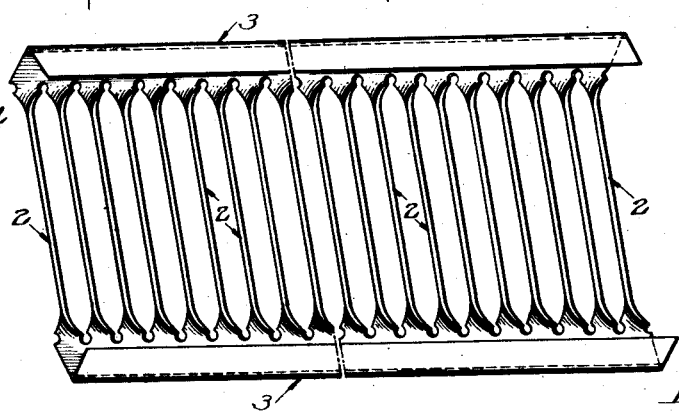
Fig. 4 is a plan view of the flat sheet metal winding.

The sheet metal winding in its original form, before it is applied to the core, is flat, as illustrated in Fig. 4.

This flat winding is made from a flat rectangular metal sheet in which are formed parallel slits at the ends of which are circular holes.

The strips between the slits are turned or bent to a suitable angle to form the longitudinal conductors.

The strips which connect the longitudinal conductors are doubled or folded and ultimately form the end rings.

The ends thereof are shaped to enable the same to be united together by a lap joint.

The flat winding may be rolled into place upon the core and then its edges are welded or otherwise united to form the continuous circular end rings.

The end rings are finally perimetrically contracted or shortened to exert a continual inward radial pull upon the longitudinal conductors to hold them in firm contact with the bottoms of the slots or other seats therefor.

If the longitudinal conductors do not engage the bottoms of the slots after the winding is rolled upon the core, they may be driven or forced into engagement therewith before the end rings are contracted.

The junctures between the longitudinal conductors and end rings are bent in course of setting the longitudinal conductors in place and contracting the end rings, and thereby the metal therein is worked to strengthen the same.

The longitudinal conductors may be expanded within the slots to impinge upon the sides thereof and thereby aid in holding them in place.

Of course, other ways and methods may be employed to apply the winding to the core and make the rotor.

The machines that may be employed for making the rotor and performing the process employed therein are hereinafter explained.

Rolling machine for applying winding—Figs. 5 and 6.

The machine for rolling the winding upon the core is provided with lower rollers 4 and upper rollers 5 and 6.

These rollers are mounted upon shafts 7 and 8, and the left lower roller is removable to permit the rotor core to be placed upon the lower shaft between the lower rollers.

The intermeshing gears 9 mounted upon the shafts cause the upper and lower rollers to rotate in unison.

The winding is rolled from its flat form into a circular form upon the core by passing it between the upper and lower rollers. It is held in position as it passes to the core by pins 10 which are carried by a crossbar 11.

The end rings are formed upon the lower rollers and the longitudinal conductors are forced into the slots by the upper rollers 6.

When the winding has been applied to the core, the open end rings are welded or otherwise united into continuous or closed end rings.

If the longitudinal conductors are not in final position in the slots, they may be forced or driven into such position before the end rings are contracted.

Setting machine for placing conductors in final position—Fig. 7.

The setting machine for driving or forcing the longitudinal conductors into engagement with the bottoms of the slots is provided with a roller 12, which has teeth 13 arranged in parallel rows.

These teeth engage the longitudinal conductors, and the alternate teeth in each row are preferably offset.

The roller is turned upon a shaft 14 and the rotor is carried by a shaft or arbor 15 and turns in unison with the roller.

When the longitudinal conductors are engaged by the teeth, they are set in final position in the slots, and they may have sufficient pressure exerted thereon to cause them to be expanded laterally within the slots to impinge upon the sides thereof.

Of course, it is feasible under some conditions to set the longitudinal conductors in final position after the end rings are contracted.

Contracting machine for contracting end rings—Fig. 8.

The contracting machine for perimetrically contracting the end rings is provided with a stationary base 16, and a movable plunger 17.

The base is provided with a vertical post 18 on which the rotor is placed between circular upper and lower blocks 19, which limit the inward contraction of the end rings.

These blocks and the rotor are vertically movable upon the post and are resiliently supported upon a spring 20 arranged between the base and the lower block.

The base 16 has thereon a lower contracting ring 21 in which are set jaws 22 spaced apart engaging the lower end ring and having a supporting ring 23.

Similar jaws 24 having a supporting ring 25 engage the upper end ring and set within an upper contracting ring 26 upon which bears the movable plunger 17.

The jaws are held in position relative to each other by a spacing ring 27 in which set the supporting rings 23 and 25.

The engaging faces between the jaws and the contracting rings are inclined to cause these jaws to move radially inward as they pass into the rings.

When the plunger moves downward, the upper and lower jaws are forced radially inward by the contracting rings, and thereby the end rings are contracted to exert a continual inward pull to retain the longitudinal conductors in position.

When the longitudinal conductors are set in place and again when the end rings are contracted, the junctures between the conductors and the end rings are radially bent, and thereby the metal therein is worked and strengthened.

Of course, the invention herein set forth is susceptible of various modifications which will be within the claims hereof.

The invention is hereby claimed as follows:

1. A rotor comprising a cylindrical core having longitudinal peripheral slots, and a sheet metal winding having longitudinal conductors arranged in said slots and end rings exerting a continual inward pull upon said longitudinal conductors to hold the same firmly against seats therefor in said slots.

2. A rotor comprising a cylindrical core having longitudinal peripheral slots, and a sheet metal winding having longitudinal conductors arranged in said slots and end rings having circular perimeters and exerting a continual inward pull upon said longitudinal conductors to hold the same firmly against seats therefor in said slots.

3. A rotor comprising a cylindrical core having longitudinal peripheral slots and a sheet metal winding having longitudinal conductors arranged in said slots and circular end rings perimetrically contracted to exert a continual inward pull upon said longitudinal conductors to hold the same against seats therefor in said slots.

4. A rotor comprising a cylindrical core having longitudinal peripheral slots, and a sheet metal winding having longitudinal conductors arranged in said slots and laterally expanded to impinge upon the sides thereof and circular end rings perimetrically contracted to exert a continual inward pull upon said longitudinal conductors to hold the same against seats therefor in said slots.

5. A rotor comprising a cylindrical core having longitudinal peripheral slots, and a sheet metal winding having longitudinal conductors arranged in said slots, and folded end rings perimetrically contracted to exert a continual inward pull upon said longitudinal conductors to hold the same against seats therefor in said slots.

6. A rotor comprising a cylindrical core having longitudinal peripheral slots, and a sheet metal winding having longitudinal conductors arranged in said slots, circular end rings perimetrically contracted to exert a continual inward pull upon said longitudinal conductors to hold the same against seats therefor in said slots, and radially bent junctures between said longitudinal conductors and said end rings.

7. A rotor comprising a cylindrical core having longitudinal peripheral slots, longitudinal conductors arranged in said slots and laterally expanded to impinge upon the sides thereof, and circular end rings perimetrically contracted to exert a continual inward radial pull upon said longitudinal conductors to hold the same against seats therefor in said slots.

8. A rotor comprising a cylindrical core having longitudinal peripheral slots, longitudinal conductors arranged in said slots, circular end rings perimetrically contracted to exert a continual inward radial pull upon said longitudinal conductors to hold the same against seats therefor in said slots, and radially bent junctures between said longitudinal conductors and said end rings.

9. A rotor comprising a cylindrical core having longitudinal peripheral slots, longitudinal conductors arranged in said slots and laterally expanded to impinge upon the sides thereof, circular end rings perimetrically contracted to exert a continual inward radial pull upon said longitudinal conductors to hold the same against seats therefor in said slots, and radially bent junctures between said longitudinal conductors and said end rings.

10. The method of making a rotor provided with a cylindrical core having longitudinal peripheral slots and a winding having longitudinal conductors arranged in said slots and circular end rings connected to said conductors, consisting in applying said winding to said core, and perimetrically contracting said end rings to exert a continual inward radial pull upon said conductors to hold the same against the seats therefor in said slots.

11. The method of making a rotor provided with a cylindrical core having longitudinal peripheral slots and a winding having longitudinal conductors arranged in said slots and circular end rings connected to said conductors, consisting in applying said winding to said core, perimetrically contracting said end rings to exert a continual inward radial pull upon said conductors to hold the same against the seats therefor in said slots, and expanding said conductors to impinge against the sides of said slots.

12. The method of making a rotor provided with a cylindrical core having longitudinal peripheral slots and a winding having longitudinal conductors arranged in said slots and circular end rings connected to said conductors, consisting in applying said winding to said core, perimetrically contracting said end rings to exert a continual inward radial pull upon said conductors to hold the same against the seats therefore in said slots, and radially bending the junctures between said conductors and end rings in applying said winding to said core.

13. The method of making a rotor provided with a cylindrical core having longitudinal peripheral slots and a winding having longitudinal conductors arranged in said slots and circular end rings connected to said conductors, consisting in applying said winding to said core, perimetrically contracting said end rings to exert a continual inward radial pull upon said conductors to hold the same against the seats therefor in said slots, expanding said conductors to impinge against the sides of said slots, and radially bending the junctures between said conductors and end rings in applying said winding to said core.

14. The method of making a rotor provided with a cylindrical core having longitudinal peripheral slots and a sheet metal winding having longitudinal conductors arranged in said slots and integral circular end rings connected to said longitudinal conductors, consisting in rolling said winding into position upon said core, and perimetrically contracting said end rings to exert a continual inward radial pull upon said longitudinal conductors to hold the same against the seats therefor in said slots.

15. The method of making a rotor provided with a cylindrical core having longitudinal peripheral slots and a sheet metal winding having longitudinal conductors arranged in said slots and integral circular end rings connected to said longitudinal conductors, consisting in rolling said winding into position upon said core, perimetrically contracting said end rings to exert a continual inward radial pull upon said longitudinal conductors to hold the same against the seats therefor in said slots, and expanding said conductors to impinge against the sides of said slots.

16. The method of making a rotor provided with a cylindrical core having longitudinal peripheral slots and a winding having longitudinal conductors arranged in said slots and circular end rings connected to said longitudinal conductors, consisting in rolling said winding into position upon said core, joining the edges thereof to form continuous end rings, and perimetrically contracting said end rings to exert a continual inward radial pull upon said conductors to hold the same against the seats therefor in said slots.

17. The method of making a rotor provided with a cylindrical core having longitudinal peripheral slots and a winding having longitudinal conductors arranged in said slots and circular end rings connected to said longitudinal conductors, consisting in rolling said winding into position upon said core, joining the edges thereof to form continuous end rings, perimetrically contracting said end rings to exert a continual inward radial pull upon said conductors to hold the same against the seats therefor in said slots, and expanding said conductors to impinge against the sides of said slots.

18. The method of making a rotor, consisting in rolling a sheet metal winding into position upon the core, and then perimetrically contracting the end rings to exert a continual inward radial pull upon the longitudinal conductors to hold the same in a fixed position.

19. The method of making a rotor, consisting in rolling a sheet metal winding into position upon the core, joining the edges of the winding to form continuous end rings, and finally contracting said end rings to exert a continual inward radial pull upon the longitudinal conductors to hold the same in place.

20. The method of making a rotor provided with a cylindrical core having longitudinal peripheral slots and a winding having longitudinal conductors arranged in said slots and circular end rings connected to said longitudinal conductors, consisting in rolling said winding into position upon the core, joining the edges thereof to form continuous end rings, setting the longitudinal conductors in place against seats therefor in said slots, and contracting said end rings to exert a continual inward radial pull upon said conductors to hold the same upon said seats.

In witness whereof, I have hereunto subscribed my name.

JOHN M. BARR.